(12) United States Patent
Wang et al.

(10) Patent No.: US 9,626,691 B2
(45) Date of Patent: Apr. 18, 2017

(54) DETERMINING A BID MODIFIER VALUE TO MAXIMIZE A RETURN ON INVESTMENT IN A HYBRID CAMPAIGN

(71) Applicant: Google Inc., Mountain View, CA (US)

(72) Inventors: Zhe Wang, Sammamish, WA (US); Xiaodong Fu, Sammamish, WA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/875,967

(22) Filed: May 2, 2013

(65) Prior Publication Data

US 2015/0213485 A1    Jul. 30, 2015

(51) Int. Cl.
*G06Q 30/02* (2012.01)

(52) U.S. Cl.
CPC ..... *G06Q 30/0246* (2013.01); *G06Q 30/0273* (2013.01); *G06Q 30/0242* (2013.01)

(58) Field of Classification Search
CPC . G06Q 30/02; G06Q 30/0275; G06Q 30/0242
See application file for complete search history.

(56) References Cited

U.S. PATENT DOCUMENTS

| | | |
|---|---|---|
| 6,910,044 B2 | 6/2005 | Weinberg et al. |
| 7,231,358 B2 | 6/2007 | Singh et al. |
| 7,870,039 B1 | 1/2011 | Dom et al. |
| 7,921,052 B2 | 4/2011 | Dabney et al. |
| 8,175,914 B1* | 5/2012 | Benson et al. ............. 705/14.71 |
| 8,190,489 B2 | 5/2012 | Sandholm et al. |
| 8,204,818 B1 | 6/2012 | Aggarwal |
| 8,266,003 B1 | 9/2012 | Mirchandani et al. |
| 8,271,325 B2 | 9/2012 | Silverman et al. |
| 8,346,607 B1 | 1/2013 | Benson et al. |
| 8,433,611 B2 | 4/2013 | Lax et al. |
| 2003/0018501 A1* | 1/2003 | Shan .................. G06Q 30/0201 705/7.29 |
| 2005/0027590 A9 | 2/2005 | Gailey et al. |
| 2005/0154637 A1* | 7/2005 | Nair et al. ..................... 705/14 |
| 2005/0160002 A1* | 7/2005 | Roetter et al. ................. 705/14 |

(Continued)

OTHER PUBLICATIONS

Ackley, M.,"4 paid search strategies to advertise your entire product catalog," http://searchengineland.com/4-paid-search-strategies-to-successfully-advertise-your-entire-product-catalog-172424, Sep. 26, 2013, page accessed Oct. 17, 2013, 3 pages.

(Continued)

*Primary Examiner* — Vincent Cao
(74) *Attorney, Agent, or Firm* — Foley & Lardner LLP; John D. Lanza (57) ABSTRACT

Systems and methods for determining a bid modifier value include determining, for one or more sets of keywords used in a campaign, a predicted conversion rate for a first device type and a predicted conversion rate for a second device type. Predicted campaign-level conversion rates are determined for the first and second device types using the predicted conversion rates for the one or more sets of keywords used in the campaign. A ratio is also determined between the predicted campaign-level conversion rate for the first device type and the predicted campaign-level conversion rate for the second device type. The ratio may be used as a bid modifier value that relates bids for the first device type to bids for the second device type.

17 Claims, 4 Drawing Sheets

(56) References Cited

U.S. PATENT DOCUMENTS

| | | | |
|---|---|---|---|
| 2006/0041500 | A1 | 2/2006 | Diana et al. |
| 2006/0069614 | A1 | 3/2006 | Agarwal et al. |
| 2006/0184417 | A1* | 8/2006 | Van der Linden et al. .... 705/14 |
| 2006/0224445 | A1* | 10/2006 | Axe ...................... G06Q 30/02 705/14.69 |
| 2006/0224447 | A1 | 10/2006 | Koningstein |
| 2007/0094072 | A1* | 4/2007 | Vidals et al. .................. 705/14 |
| 2007/0162379 | A1 | 7/2007 | Skinner |
| 2007/0265923 | A1 | 11/2007 | Krassner et al. |
| 2007/0288317 | A1* | 12/2007 | Gupta et al. .................... 705/14 |
| 2007/0294149 | A1 | 12/2007 | Lu et al. |
| 2008/0140489 | A1 | 6/2008 | Berkhin et al. |
| 2008/0275777 | A1 | 11/2008 | Protheroe et al. |
| 2009/0006375 | A1 | 1/2009 | Lax et al. |
| 2009/0132353 | A1 | 5/2009 | Maggenti et al. |
| 2010/0042421 | A1 | 2/2010 | Bai et al. |
| 2010/0094712 | A1 | 4/2010 | Lai |
| 2010/0138291 | A1 | 6/2010 | Silverman et al. |
| 2010/0211460 | A1 | 8/2010 | Agarwal et al. |
| 2010/0223141 | A1 | 9/2010 | Spencer et al. |
| 2011/0015994 | A1 | 1/2011 | Ramer et al. |
| 2011/0035277 | A1 | 2/2011 | Kodialam et al. |
| 2011/0040616 | A1 | 2/2011 | Kannan et al. |
| 2011/0071879 | A1 | 3/2011 | Flockhart et al. |
| 2011/0071900 | A1 | 3/2011 | Kamath et al. |
| 2011/0078000 | A1 | 3/2011 | Ma et al. |
| 2011/0179033 | A1 | 7/2011 | Mount et al. |
| 2011/0231264 | A1 | 9/2011 | Dilling et al. |
| 2011/0231296 | A1 | 9/2011 | Gross et al. |
| 2011/0238487 | A1* | 9/2011 | Chang .............. G06Q 10/06375 705/14.42 |
| 2011/0258049 | A1 | 10/2011 | Ramer et al. |
| 2011/0270673 | A1 | 11/2011 | Lin et al. |
| 2012/0036024 | A1 | 2/2012 | Mysen et al. |
| 2012/0041816 | A1 | 2/2012 | Buchalter |
| 2012/0066065 | A1 | 3/2012 | Switzer |
| 2012/0123856 | A1 | 5/2012 | Paunikar et al. |
| 2012/0166452 | A1 | 6/2012 | Tseng |
| 2012/0310729 | A1 | 12/2012 | Dalto et al. |
| 2013/0018722 | A1 | 1/2013 | Libby |
| 2013/0159092 | A1 | 6/2013 | Lahaie et al. |
| 2013/0204664 | A1 | 8/2013 | Romagnolo et al. |
| 2013/0212108 | A1 | 8/2013 | Armon-Kest et al. |
| 2013/0212608 | A1 | 8/2013 | Cansler et al. |
| 2013/0238762 | A1 | 9/2013 | Raleigh et al. |
| 2013/0339126 | A1 | 12/2013 | Cui et al. |
| 2014/0006170 | A1 | 1/2014 | Collette et al. |
| 2014/0100944 | A1 | 4/2014 | Zhu et al. |
| 2014/0122253 | A1 | 5/2014 | Vassilvitskii et al. |
| 2014/0222587 | A1 | 8/2014 | Feldman et al. |
| 2014/0278855 | A1 | 9/2014 | Clark et al. |

OTHER PUBLICATIONS

AW4P: Internet Marketing & SEO Blog, printed from Internet address: http://aw4p.blogspot.com/2007/03/little-known-adwords-features-bid.html on Jan. 24, 2013, 5 pages.

Dent, A., "Product listing ads: How to maximize your returns," http://searchenginewatch.com/article/2263233/Product-Listing-Ads-How-to-Maximize-Your-Returns, Apr. 23, 2013, page accessed Oct. 17, 2013, 3 pages.

Google Help, "Understanding bidding basics." https://support.google.com/adwords/answer/2459326?hl=en, page accessed Jul. 23, 2014, 3 pags.

Google Help, Target Ads to Geographic Locations—AdWords Help, printed from Internet address: https://support.google.com/adwords/answer/1722043?hl=en on Jul. 23, 2014, 8 pages.

Google Inc., Using Custom Scheduling, printed from Internet address: http://www.support.google.com/adwords/answer/2404244/?hl=en on Jan. 23, 2013, 6 pages.

Google, Inc., Enter Experimental Bids in AdWords Editor, printed from Internet address: http://support.google.com/adwords/editor/answer/1399246?hl=en on Jan. 23, 2013, 2 pages.

Google, Inc., Google Plans to Combine Mobile & Desktop Ads—Search Engine Watch (#SEW), printed from Internet address: http://searchenginewatch.com/article/2219061/Google-Plans-to-Combine-Mobile-Desktop . . . on Jan. 24, 2013, 7 pages.

Google, Inc., Why Costs Might Exceed Your Daily Budget, printed from Internet address: http://support.google.com/adwords/answer/2375423?hl=en on Mar. 21, 2013, 3 pages.

Highlights of the SMX Advanced Session on PPC Enhanced Campaigns—Sep. 11, 2013 http://searchengineland.com/highlights-of-the-smx-advanced-session-on-ppc-enhanced-campaigns.

International Search Report and Written Opinion mailed Mar. 26, 2014, in PCT Application No. PCT/US2013/073328 (12 pages).

Office Action on U.S. Appl. No. 14/049,889 dated Mar. 12, 2014.

Office Action on U.S. Appl. No. 14/103,395 dated Mar. 26, 2014, 11 pages.

US Notice of Allowance on U.S. Appl. No. 14/106,395 DTD Sep. 24, 2014, 8 pages.

US Office Action on U.S. Appl. No. 14/0149,889, dtd Sep. 2, 2014, 23 pages.

US Office Action on U.S. Appl. No. 14/055,523 DTD Oct. 20, 2014, 25 pages.

Vigneron, Benjamin, How to Determine Your Mobile & Geo Bid Multipliers for Enhanced Campaigns, Mar. 22, 2013, 7 pages.

Google Inc., Target CPA Bidding: A New Way to Meet your ROI Goals with Conversion Optimizer, dated May 3, 2010, printed from Internet address: www.adwords.blogspot.com/2010/05/target-cpa-bidding-new-way-to-meet-your.html on Apr. 12, 2013, 2 pages.

Google, Inc., About Conversion Optimizer, printed from Internet address: www.support.google.com/adwords/answer/2471188?hl=en on Apr. 12, 2013, 4 pages.

Marin Software, ROI-Based Campaign Management: Optimization Beyond Bidding, White Paper, Oct. 2009, 16 pages.

Office Action on U.S. Appl. No. 14/055,523 dated Feb. 10, 2014, 18 pages.

Office Action on U.S. Appl. No. 14/073,086 dated Jan. 8, 2015.

US Office Action on 098981-1095 dated May 7, 2015.

US Office Action on U.S. Appl. No. 14/073,086 DTD Jun. 1, 2015, 11 pgs.

Office Action on U.S. Appl. No. 13/797,597 dated Sep. 8, 2015.

Office Action on U.S. Appl. No. 13/911,898 dated Oct. 23, 2015.

Notice of Allowance on U.S. Appl. No. 14/073,086 dated Dec. 16, 2015.

Office Action on U.S. Appl. No. 14/055,523 dated Dec. 18, 2015.

US Notice of Allowance on U.S. Appl. No. 14/055,523 dated Jul. 6, 2016.

US Notice of Allowance on U.S. Appl. No. 14/073,086 dated Dec. 16, 2015.

US Office Action on U.S. Appl. No. 14/055,523 dated Dec. 18, 2015.

US Office Action on U.S. Appl. No. 14/073,086 dated Aug. 10, 2016.

US Office Action on U.S. Appl. No. 14/106,401 dated Mar. 25, 2016.

US Office Action on U.S. Appl. No. 14/106,412 dated Mar. 24, 2016.

U.S. Appl. No. 13/797,597, filed Mar. 12, 2013.
U.S. Appl. No. 13/911,898, filed Jun. 6, 2013.
U.S. Appl. No. 14/049,889, filed Oct. 9, 2013.
U.S. Appl. No. 14/106,395, filed Dec. 13, 2013.
U.S. Appl. No. 14/106,401, filed Dec. 13, 2013.
U.S. Appl. No. 14/106,412, filed Dec. 13, 2013.
U.S. Appl. No. 14/073,086, filed Nov. 6, 2013.

* cited by examiner

DETERMINING A BID MODIFIER VALUE TO MAXIMIZE A RETURN ON INVESTMENT IN A HYBRID CAMPAIGN

BACKGROUND

Online content may be received from various first-party or third-party sources. In general, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). More generally, a first-party content provider may be any content provider that allows another content provider (i.e., a third-party content provider) to provide content in conjunction with that of the first-party.

In some cases, third-party content may be selected for presentation with first-party content based on the results of a content auction. For example, third-party content providers may place bids in a content auction to compete for the ability to provide an advertisement with first-party content. The third-party content providers may also have disparate goals in mind when placing content auction bids. For example, a provider of a public service message may wish to maximize exposure of the public service message to users. In contrast, an online retailer may wish to maximize the number of times that an advertisement is presented with first-party content and leads to an online sale. However, it is challenging and difficult to develop systems that determine an auction bid on behalf of a third-party content provider that achieves a specified goal of the content provider.

SUMMARY

Implementations of the systems and methods for determining a bid modifier value to maximize a return on investment in a hybrid campaign are disclosed herein. One implementation is a method of determining a bid modifier value to maximize a return on investment in a hybrid campaign. The method includes determining, for one or more sets of keywords used in the campaign, a predicted conversion rate for a first device type and a predicted conversion rate for a second device type. The method also includes calculating, by a processor, predicted campaign-level conversion rates for the first and second device types using the predicted conversion rates for the one or more sets of keywords used in the campaign. The method further includes determining a ratio between the predicted campaign-level conversion rate for the first device type and the predicted campaign-level conversion rate for the second device type. The method additionally includes using the ratio as the bid modifier value that relates bids for the first device type to bids for the second device type.

Another implementation is a system for determining a bid modifier value to maximize a return on investment in a hybrid campaign. The system includes one or more processors configured to determine, for one or more sets of keywords used in the campaign, a predicted conversion rate for a first device type and a predicted conversion rate for a second device type. The one or more processors are also configured to calculate predicted campaign-level conversion rates for the first and second device types using the predicted conversion rates for the one or more sets of keywords used in the campaign. The one or more processors are further configured to determine a ratio between the predicted campaign-level conversion rate for the first device type and the predicted campaign-level conversion rate for the second device type. The one or more processors are also configured to use the ratio as the bid modifier value that relates bids for the first device type to bids for the second device type.

A further implementation is a computer-readable storage medium having machine instructions stored therein, the instructions being executable by a processor to cause the processor to perform operations. The operations include determining, for one or more sets of keywords used in a campaign, a predicted conversion rate for a first device type and a predicted conversion rate for a second device type. The operations also include calculating predicted campaign-level conversion rates for the first and second device types using the predicted conversion rates for the one or more sets of keywords used in the campaign. The operations further include determining a ratio between the predicted campaign-level conversion rate for the first device type and the predicted campaign-level conversion rate for the second device type. The operations also include using the ratio as the bid modifier value that relates bids for the first device type to bids for the second device type.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, a content selection service may determine a bid amount for a third-party content provider based on any number of factors. In some implementations, the content selection service may use data indicative of interactions with third-party content to determine a bid amount on behalf of a third-party content provider (e.g., the bid amount may be based in part on how frequently users click on the third-party content when the content is selected). The content selection service may also use content interaction data to determine the performance of the first-party provider's content. For example, users may be more inclined to click on third-party content on certain webpages over others. Auction bids to place third-party content may be higher for high-performing websites, while the bids may be lower for low-performing websites.

In some implementations, a content selection service may be configured to allow a third-party content provider to create one or more campaigns, such as an advertising campaign. As part of a campaign, the third-party content provider may set any number of parameters that control how and when the third-party content provider participates in a content auction. For example, a campaign may include sets of one or more keywords that control when a bid is placed in a content auction on behalf of the third-party content provider. If a user executes a search query containing any of the sets of keywords, the third-party content provider may bid in a content auction to include the third-party content with the search results.

Another auction parameter that may be set in a content selection service is a parameter that controls which device types are eligible to receive the third-party content from a third-party content provider. For example, the content selection service may categorize devices as being either mobile devices (e.g., cellular phones) or desktop devices (e.g., a home computer). Tablet computing devices may be categorized under either category or their own category, but may typically fall under the desktop devices category, since many tablet devices are only WiFi enabled. Thus, a third-party content provider may specify that they only wish to provide advertisements to mobile or desktop devices. Any other grouping of device types may be used by the content selection service to control which device types are eligible to receive third-party content from a particular provider, in other implementations.

According to various implementations, a content selection service may allow a third-party content provider to establish a hybrid campaign in which the third-party content is eligible to be provided to two or more device types. For example, a third-party content provider may place auction bids in a content auction to provide content to both desktop and mobile devices. In some implementations, the content selection service may use a bid modifier value to relate bids used for different device types. In general, a bid modifier value is a value that defines a linear relationship between bids used for different device types. For example, assume that a third-party content provider places a bid of $1 for desktop devices and a bid modifier value of −50% for mobile devices. Accordingly, the third-party content provider may bid $0.50 for mobile devices Some third-party content providers may have the goal of a user being presented with third-party content from the provider, the user interacting with the content (e.g., clicking on the content), and the user performing a particular action (e.g., making an online purchase, downloading software, signing up for an alert, etc.). According to various implementations, the content selection service may be configured to automatically generate a bid modifier value for a third-party content provider to achieve the specified goal, such as the presentation of the provider's content leading to a user performing a particular action. For example, the content selection service may determine that a bid modifier value that relates mobile to desktop bids should be −20%, to maximize the cost per resulting user action for the third-party content provider.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a device identifier, may be anonymized in one or more ways before it is stored or used, so that personally identifiable information is removed when generating parameters (e.g., demographic parameters) used by the content selection service to select third-party content. For example, a device identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

Figure 1:
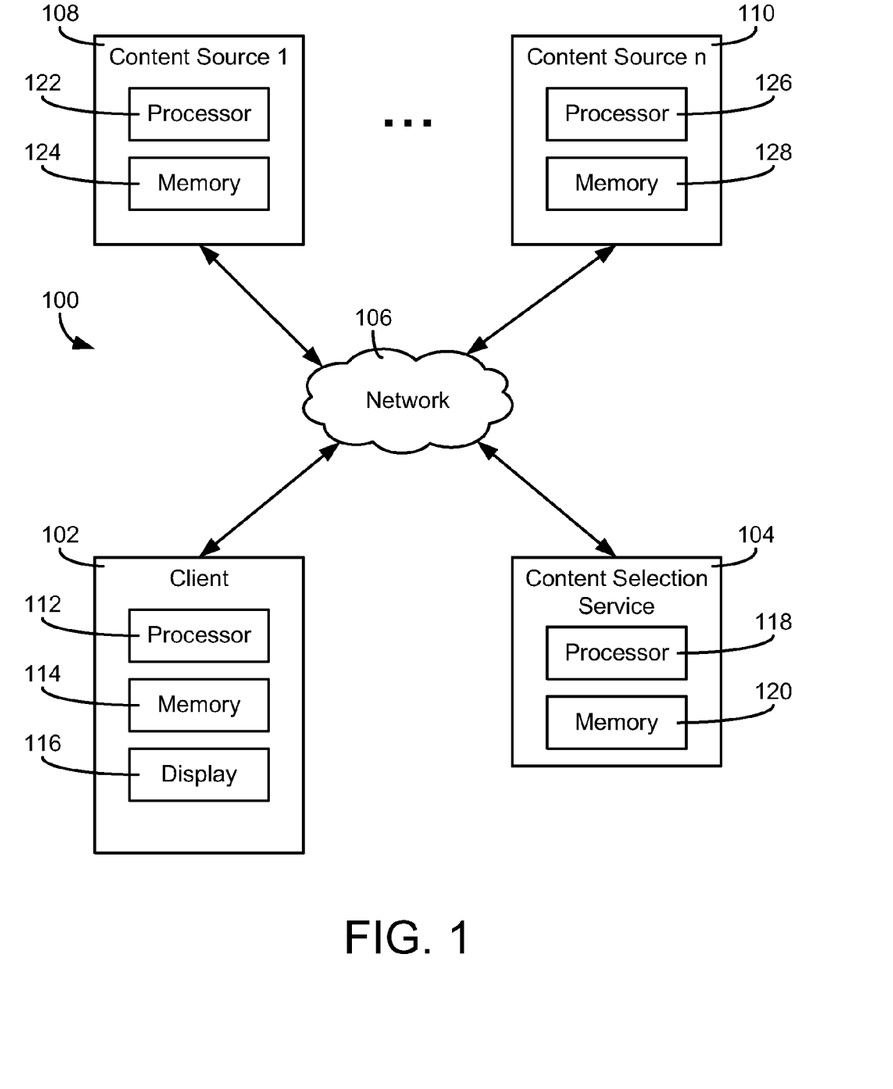
FIG. 1 is a block diagram of a computer system in which third-party content is selected for a client device.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, a satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114 in communication with processor 112. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, memory 124 of content source 108 may include instructions such as web server software, FTP serving software, and other types of software that cause content source 108 to provide content via network 106.

According to various implementations, content sources 108, 110 may provide webpage data to client device 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may provide webpage data that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to content selection service 104.

Content selection service 104 may be configured to allow the user of client device 102 to control which information about the user is collected and used by content selection service 104 via a device identifier. In addition, to the extent that content selection service 104 does collect and use information about the user, the data may be anonymized such that the user's identity cannot be determined by analyzing the collected data. In other words, the user of client device 102 may control what types of information about the user is collected by content selection service 104 and how the information is used. In one embodiment, the user of client device 102 may set one or more preferences (e.g., as part of an online profile) that control how content selection service 104 collects and uses information about the user. In another embodiment, content selection service 104 may set a cookie or other device identifier on client device 102 that signifies that the user of client device 102 has elected not to allow content selection service 104 to store information regarding him or her.

If the user of client device 102 has elected to allow content selection service 104 to use information regarding him or her, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may use history data associated with device identifiers to generate metrics regarding the presentation of third-party content and/or the actions that result therefrom. For example, content selection service 104 may analyze history data received from any number of client devices to determine the number of times a particular piece of third-party content was presented (e.g., an impression count), the number of times a user clicked on the presented content (e.g., a click count), or the number of times a user performed a particular action after clicking on the presented content (e.g., a conversion count). In some implementations, content selection service 104 may determine one or more rates using the counts. For example, content selection service 104 may determine a click through rate by dividing the number of clicks by a number of impressions or a conversion rate by dividing the number of times a particular action was performed by the number of impressions. Content selection service 104 may report any generated metrics to a third-party content provider and/or use the metrics as part of the generation of a bid amount on behalf of the provider.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase. Such bids are typically referred to as being on a cost per acquisition (CPA) or cost per conversion basis.

A campaign created via content selection service 104 may also include selection parameters that control when a bid is placed on behalf of a third-party content provider in a content auction. If the third-party content is to be presented in conjunction with search results from a search engine, for example, the selection parameters may include one or more sets of search keywords. For example, the third-party content provider may only participate in content auctions in which a search query for "golf resorts in California" is sent to a search engine. Other exemplary parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of a particular online newspaper.

Content selection service 104 may also be configured to determine a bid modifier value for use in a hybrid campaign (e.g., a campaign having parameters that specify two or more device types as being eligible to receive third-party content from a provider, such as desktop and mobile devices). According to various implementations, the bid modifier value relates bids for one type of device to bids for another type of device. For example, a bid modifier value of +120% that relates desktop bids to mobile bids may correspond to a mobile bid of $12 if the desktop bid is $10. In some implementations, content selection service 104 is configured to upgrade one or more campaigns to be a hybrid campaign that uses a bid modifier value. For example, two campaigns that specify the same keywords for different device types may be merged into a single campaign that uses the keywords and a bid modifier value. Content selection service 104 may generate a bid modifier value on behalf of a third-party content provider determined by content selection service 104 to optimize one or more metrics regarding the presentation of the provider's content (e.g., a conversion rate, an ROI, etc.).

Content selection service 104 may be configured to generate a bid modifier value in some or all of the following cases: 1) sibling campaigns are merged into a single hybrid campaign (e.g., campaigns that use the same or similar parameters for different devices types), 2) a bid modifier is suggested for a hybrid campaign, or 3) automatically combining a bid modifier with a determined bid amount for bidding in a hybrid campaign. In the first case, two or more campaigns that focus on different device types may be merged together based on their common parameters (e.g., keywords used in both campaigns) and a bid modifier may be used to relate bids for the different device types. For example, two campaigns that specify the keywords "best insurance rates" and focus on different device types (e.g., desktop and mobile devices) may be combined using a bid modifier value that relates bids for mobile devices to bids for desktop devices. After merging the campaigns, bid modifier values that maximize a provider's ROI may be suggested to the provider and/or used in conjunction with varying bids that are determined to maximize the provider's ROI.

In some implementations, content selection service 104 may determine a bid modifier value by calculating a predicted conversion rate for each keyword/device type pair in a campaign. For example, assume that a third-party content provider specifies the keywords "cheap insurance" and "lowest cost insurance" as keywords in one or more campaigns. Also, assume that the provider has specified both desktop and mobile devices as part of the campaigns. Content selection service 104 may determine predicted conversion rates for the "cheap insurance" keywords for both desktop and mobile devices and predicted conversion rates for the "lowest cost insurance" for both desktop and mobile devices. Content selection service 104 may determine campaign level predicted conversion rates for each device type based on the predicted keyword-level device types.

In various implementations, content selection service 104 may base a bid modifier value on predicted campaign-level conversion rates for different device types. In one implementation, content selection service 104 predicts a campaign-level conversion rate for a device type using a weighted average of conversion rates for the keywords. The keyword-level conversion rates may be weighted using a traffic metric for the keywords (e.g., number of impressions, clicks, etc. in a given time period). For example, content selection service 104 may predict a campaign-level conversion rate for a device type as follows:

$$pcvr(\text{device\_type}) = \sum_{i \in KW} \text{click}_i * pcvr_i(\text{device\_type}) / \sum_i \text{click}_i$$

where pcvr(device_type) is the predicted conversion rate for a particular device type (e.g., desktop devices, mobile devices, etc.), i represents a set of one or more keywords used in a campaign, and $\text{click}_i$ is a metric regarding the number of times a user clicked on third-party content that was selected by content selection service 104 based in part on the set of keywords. Thus, the predicted keyword-level conversion rate for each set of keywords is weighted based on the number of clicks for its set of keywords in relation to the total number of clicks across all sets of keywords. In some implementations, content selection service 104 may use the ratio of predicted campaign level conversion rates as a bid modifier value. For example, content selection service 104 may determine a bid modifier value ($\alpha$) as follows:

$$\alpha = \frac{pcvr(\text{mobile})}{pcvr(\text{desktop})}$$

where pcvr(mobile) and pcvr(desktop) are the predicted campaign-level conversion rates for each device type. Other ratios may also be used for the bid modifier value in other implementations (e.g., the ratio of a conversion rate for desktop devices to a conversion rate for mobile devices, etc.).

For desktop devices, it may be assumed that the base bid does not change and that the predicted conversion rate can be determined using a history of clicks associated with desktop devices. For example, content selection service 104 may determine a predicted, campaign-level conversion rate as follows:

$$pcvr(\text{desktop}) = \sum_{i \in KW} \text{click}_{i,d} * pcvr_{i,d}(\text{desktop}) / \sum_i \text{click}_{i,d}$$

where $pcvr_{i,d}(\text{desktop})$ is the predicted conversion rate for desktop devices using a particular set of keywords (e.g., the ith set of keywords) and $\text{click}_{i,d}$ is the number of clicks for desktop devices using the set of keywords. In some implementations, KW may represent all of the sets of keywords for a campaign. In further implementations, KW may represent all of the sets of keywords across multiple campaigns of a third-party content provider that use different device types. For example, metrics regarding keyword sets that overlap in desktop-only and mobile-only campaigns may be used by content selection service 104 in the calculation of the predicted conversion rates for both mobile and desktop devices. In some implementations, content selection service 104 may not calculate a bid modifier value if traffic metrics for a third-party content provider heavily favor one device type over another. For example, content selection service 104 may provide an alert to a third-party content provider that a bid modifier value cannot be determined because the provider's traffic to one device type is below a threshold amount.

For mobile bids, content selection service 104 may project the corresponding traffic (e.g., number of clicks) associated with changes to the mobile bid amount using a particular bid modifier value. If the ratio of predicted, campaign-level conversion rates are used by content selection service 104 as a bid modifier, this means that the keyword-level bids are related as follows:

$$\text{bid}_{i,m} = \text{bid}_{i,d} * \alpha$$

where $\text{bid}_i$, and $\text{bid}_{i,d}$ are the keyword-level bid amounts for mobile and desktop devices, respectively, and a is a bid modifier value that is the ratio of predicted, campaign-level conversion rates for the mobile and desktop devices, respectively. Content selection service 104 may use linear extrapolation or another projection technique to determine the value of the bid modifier value (a). Content selection service 104 may also iteratively calculate the projected traffic for mobile devices and the resulting bid modifier values until the bid modifier values converge on the optimal solution. For example, one projection for mobile devices may be:

$$\text{projection}(\alpha, i) = f(\text{bid}_{i,m}, \text{stats}_{i,m}, \alpha * \text{bid}_{i,d}) = \text{clicks}_{i,m} * \frac{\text{bid}_{i,d} * \alpha}{\text{bid}_{i,m}}$$

where i is the ith keyword or set of keywords used in the campaign and a is a bid modifier value that changes the bid for desktop devices (e.g., $\text{bid}_{i,d}$) to determine a mobile bid amount, Content selection service 104 may also restrict the traffic extrapolation range using a click through rate (CTR) variance at different values based on the current bid. in other words, content selection service may determine the pcvr (mobile) as follows:

$$pcvr(\text{mobile}) = \sum_{i \in KW} \text{projection}(\alpha, i) * pcvr_{i,m} / \sum_i \text{projection}(\alpha, i)$$

where a is the ratio of predicted conversion rates for mobile devices to desktop devices. To determine the value of the bid modifier value a, the calculations of the mobile conversion rate (e.g., pcvr(mobile)) and the bid modifier value may be repeated iteratively until a converges within a predefined threshold.

After a campaign has been upgraded to be a hybrid campaign that uses a bid modifier value to relate bids across different device types, content selection service 104 may automatically determine a new bid modifier value based on a specified goal of a third-party content provider. In other words, a hybrid campaign may have an initial bid modifier value $\alpha_0$ as determined by content selection service 104 above. For example, a third-party content provider may specify that he or she wishes to maximize the number of conversions or revenues the result from content selection service 104 selecting the provider's content for presentation with first-party content. Thus a post-upgrade, hybrid campaign may have bids for different device types as follows:

$$\text{bid}_{i,m} = \text{bid}_{i,d} * \alpha_0$$

where $\alpha_0$ is an initial bid modifier value determined by content selection service 104.

In some implementations, bids may be determined by content selection service 104 such that the expected return for each keyword is the same. For example, assume that a third-party content provider specifies a target cost per action (CPA) (e.g., a cost per user making a purchase, etc.). The bid may be determined by content selection service 104 as follows:

$$bid_i = c * pcvr_i * CPA\_target$$

where c is the average cost per action across all sets of keywords (e.g. $cpc_i/pcvr_i=c$) and CPA_target is an upper bound amount that a third-party content provider has agreed to pay for an action (e.g., a user making a purchase on the provider's website).

According to various implementations, content selection service 104 may use an iterative approach to periodically update a bid modifier value or to suggest a change to a bid modifier value to a third-party content provider. In some implementations, content selection service 104 recalculates the bid modifier value for a campaign every hour, day, week, month, or at any other periodic amount of time. For example, assume that content selection service 104 has calculated a bid modifier value m for mobile bids. In some implementations, content selection service 104 may determine periodic changes to the bid modifier value and apply a smoothing function as follows:

$$m(t+1) = \beta * m(t) + (1-\beta) * m'(t+1)$$

where m'(t+1) is the bid modifier value calculated at time t+1, m(t) is the previous bid modifier value calculated at time t, and β is a parameter that controls the amount of smoothing. In one implementation, a β=0.7 may be used. In other implementations, different values of β may be used.

Content selection service 104 may provide an indication of third-party content selected via a content auction to client device 102 for presentation with first-party content. In some cases, the indication is the selected third-party content itself. For example, content selection service 104 may provide an advertisement to client device 102 for presentation within an application on client device 102 (e.g., a game, a navigation program, etc.), on a first-party webpage (e.g., a webpage served by content source 108 to client device 102), or with first-party search results from an online search engine. In further implementations, the indication of the selected third-party content may correspond to a command sent to client device 102 that causes client device 102 to retrieve the selected third-party content. For example, client device 102 may retrieve the selected third-party content from one of content sources 108, 110 or from a cache of third-party content stored in memory 114.

While content selection service 104 typically determines a bid modifier value for a campaign, content selection service 104 may also determine such a value for any other grouping of keywords. For example, content selection service 104 may determine a bid modifier value for a sub-group of keywords that are part of a campaign (e.g., an ad group). In another example, content selection service 104 may determine a bid modifier value at the account level for a content provider (e.g., an account that may include one or more campaigns).

Figure 2:
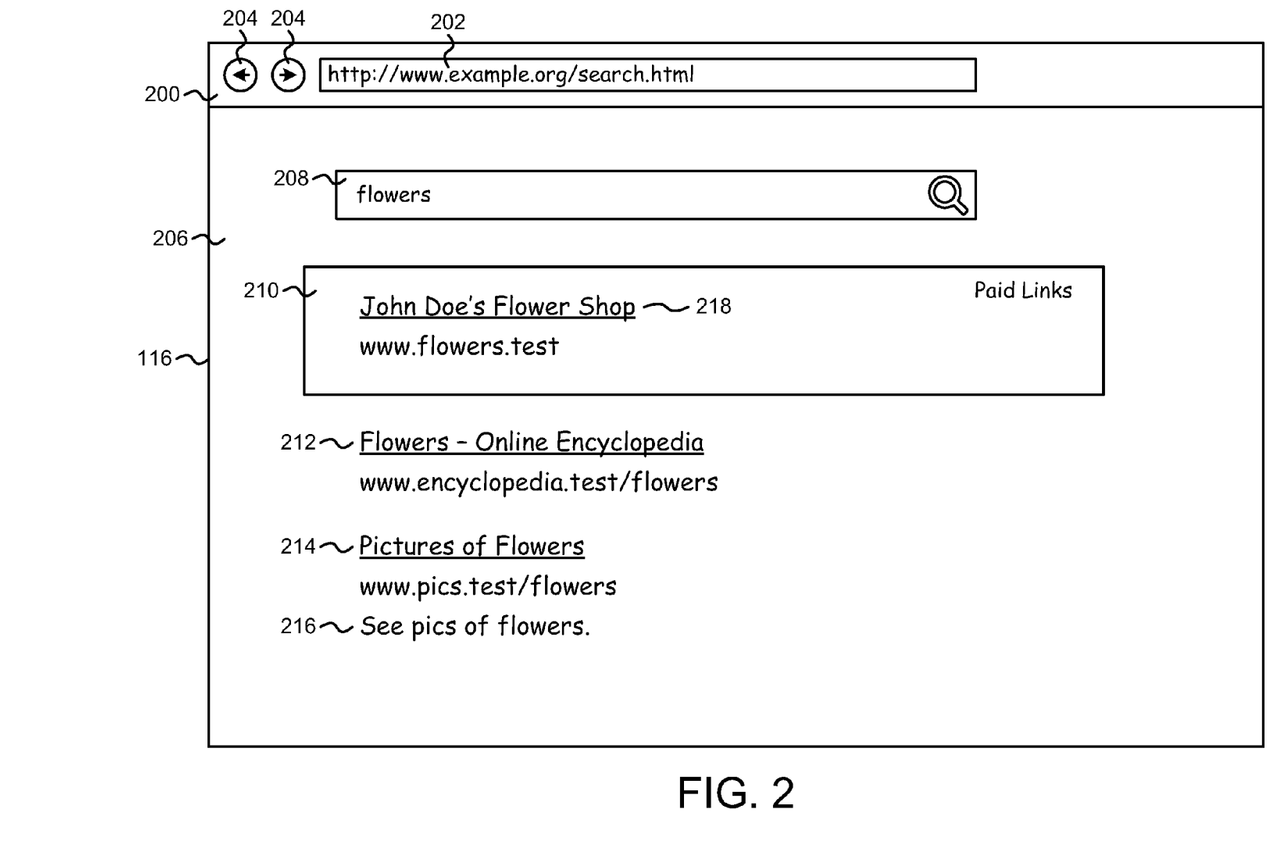
FIG. 2 is an illustration of an electronic display showing first-party search results with third-party content.

Referring now to FIG. 2, an illustration is shown of electronic display 116 showing first-party search results with third-party content. In some implementations, client device 102 may access a first-party search engine via network 106 by executing a web browser 200. In other implementations, the search engine may provide search results for display by client device 102 within a stand-alone application. For example, a navigation application executed by client device 102 may include a search feature that allows search results from the search engine to be presented within the application.

Web browser 200 may operate by sending a webpage request to a network address entered into field 202 by a user input device (e.g., a keypad, a touch screen display, etc.). For example, the user of client device 102 may enter the URL of www.example.org/search.html to visit the corresponding web-based search engine. Web browser 200 may also include various controls 204 configured to allow the user of client device 102 to navigate between webpages.

As shown, the first-party search engine accessed by client device 102 may provide a webpage 206 to client device 102 that is configured to allow for searches and search results to be updated on the fly. For example, webpage 206 may include a search field 208 that receives a search query and webpage 206 may also display search results obtained using the query. In other implementations, search field 208 may be displayed separately from the search results (e.g., search field 208 and the search results may appear on different webpages, screens, etc.). Search field 208 is generally configured to receive one or more search terms to be searched by the search engine. For example, the search term "flowers" may be entered into search field 208 and used to search for links to online resources devoted to flowers. A search query may be entered into search field 208 via a touch screen display, keyboard, a microphone (e.g., via voice recognition), or another user interface device of client device 102.

In response to receiving the search query entered into search field 208, the search engine may retrieve any number of links to websites or other online services regarding the query. For example, the search engine may retrieve the URLs of websites devoted to the topic of flowers and provide them as hyperlinks 212, 214 on webpage 206 as search results. In some implementations, the search engine may maintain an index of keywords used on webpages or other resources. Search results may then be ordered by the search engine based on the relevancy of the indexed webpages relative to the search query. A summary of the webpage or other resource may also be provided on webpage 206 by the search engine. For example, hyperlink 214 may have an associated description 216 that gives more detail about the linked webpage. Since hyperlinks 212, 214 are presented as search results based solely on their relevancy to the search query, they may be considered first-party content.

In addition to webpage 206 including hyperlinks 212, 214 as search results, webpage 206 may also include third-party content 210 selected by content selection service 104. Third-party content 210 may be, in one example, a hyperlink 218 to a third-party content provider's website. Third-party content 210 may also identify itself as being third-party content, such as including a notification that the hyperlink is a paid link. Other exemplary forms of third-party content that may be presented in conjunction with search results may include a location (e.g., the location of the nearest florist to client device 102) or links to perform online actions, such as playing a piece of media content.

Content selection service 104 may conduct a content auction to select third-party content 210. In response to the search query entered into search field 208, content selection service 104 may first determine which third-party content providers are to compete in a content auction. For example, only third-party content providers that specify the search term "flowers" may participate in the content auction (e.g., based on the providers specifying the keyword "flowers" as part of a campaign). Another exemplary campaign parameter that may also be used to control which third-party content providers participate in the auction includes the geographic location of client device 102. Such a geographic location may correspond to a particular city, zip code, state, country, or other area. For example, a third-party advertiser located in Great Britain may only be interested in advertising to client devices located there and not in the United States of America. The device type of client device 102 may also be used as a further parameter to control which third-party content providers participate in the content auction. For example, only certain providers may participate in the auction if client device is a mobile device. Based on the bid amounts of the providers that participate in the content auction and other factors, content selection service 104 may select third-party content 210 for presentation with the search results on webpage 206.

Figure 3:
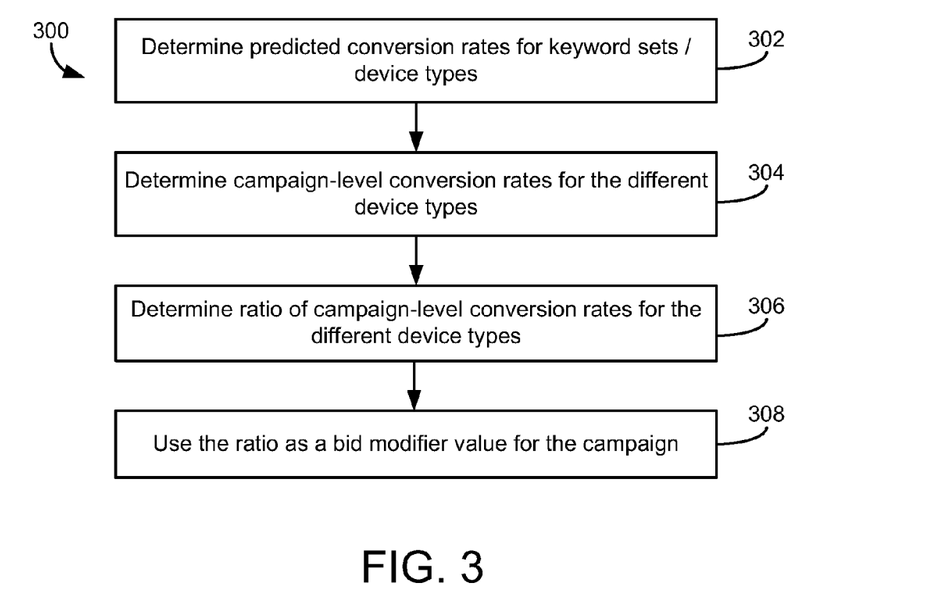
FIG. 3 is a flow diagram depicting the steps taken in one implementation of a process for determining a bid modifier value for a hybrid campaign.

Referring now to FIG. 3, a flow diagram of a process 300 for determining a bid modifier value for a hybrid campaign is shown. As depicted in FIG. 3, predicted conversion rates for keyword sets and device types are determined (step 302), the keyword-level conversion rates are then used to predict campaign-level conversion rates for the different device types (step 304), the ratio of the campaign-level conversion rates is then determined (step 306), and the ratio is used as a bid modifier value relating bids for the different device types (step 308). Process 300 may be implemented by one or more computing devices executing stored instructions. For example, process 300 may be implemented by content selection service 104 shown in FIG. 1.

Still referring to FIG. 3, and in more detail, process 300 includes determining predicted conversion rates for different pairs of device types and keyword sets (step 302). For example, assume that a third-party content provider has a first campaign that is desktop-only and uses the keyword sets "best bagel" and "favorite bagel" as campaign parameters. Further, assume that the content provider also has a second campaign that is mobile-only and uses the same keyword sets as the desktop-only campaign. In some implementations, the predicted conversion rates may be based on a history of traffic metrics regarding the third-party content provider's content. The traffic metrics may be generated over any period of time, such as a day, a week, thirty days, etc. For example, the number of conversions in the past thirty days for a given set of keywords and device type may be divided by the number of times the third-party content was provided, to generate a predicted conversion rate.

Process 300 includes determining campaign-level conversion rates for the device types (step 304). After the keyword-level conversion rates are predicted in step 302, these conversion rates may be combined to predict campaign-level conversion rates for each device type. In some implementations, a campaign-level conversion rate may be predicted using a weighted average of the keyword-level conversion rates. Each keyword-level conversion rate may be weighted based on the comparative amount of traffic associated with each set of keywords and/or based on other factors as well. For example, assume that the keyword set "best bagel" receives twice as much traffic as the keyword set "favorite bagel." In some implementations, the predicted conversion rate for the "best bagel" keyword set may receive a greater weighting than for "favorite bagel," when determining a campaign-level predicted conversion rate.

Process 300 includes determining a ratio of campaign-level conversion rates for the device types (step 306). According to various implementations, a ratio of the campaign-level conversion rates determined in step 304 may be calculated. For example, one potential ratio is the ratio of the predicted conversion rate for mobile devices to the predicted conversion rate for desktop devices (e.g., $\alpha=pcvr(mobile)/pcvr(desktop)$). The ratios of other device types may be determined in other implementations. For example, the ratio of conversion rates for tablet devices to desktop devices may be determined in other implementations.

Process 300 includes using the ratio of predicted conversion rates as a bid modifier value (step 308). For example, assume that the ratio of conversion rates is $\alpha=pcvr(mobile)/pcvr(desktop)$, as determined in step 306. In this case, a may be used as a bid modifier value that relates bids for one device type to bids for another device type. For example, a mobile bid for a particular keyword set may be related to a desktop bid for the same keyword set as follows: $bid_{i,m}=bid_{i,d}*\alpha$, where $\alpha$ is the conversion rate ratio determined in step 306. In some implementations, the bid modifier value may be used to combine device-specific campaigns into a hybrid campaign. In further implementations, the bid modifier value may be used to upgrade a mixed device campaign into a hybrid campaign that uses a bid modifier value to control bids across different device types.

Figure 4:
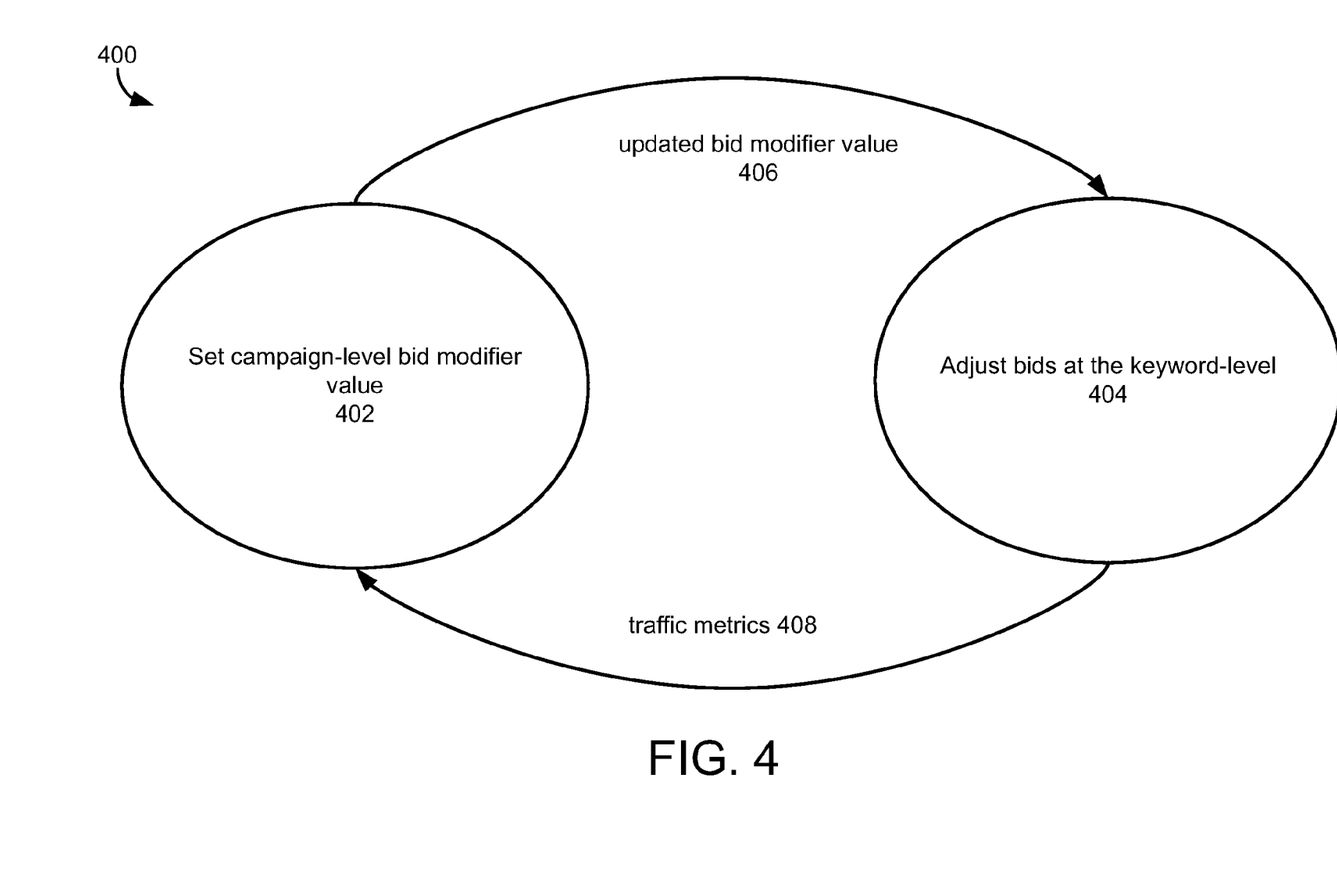
FIG. 4 depicts an iterative process for determining a bid modifier value for a hybrid campaign.

Referring now to FIG. 4, an iterative process 400 for determining a bid modifier value for a hybrid campaign is depicted. Process 400 generally includes determining a campaign-level bid modifier value (step 402) and adjusting bids at the keyword level (step 404). These steps may be repeated iteratively any number of times, to determine new bid amounts and bid modifier values. Process 400 may be implemented by one or more computing devices, such as content selection service 104 shown in FIG. 1.

Process 400 includes setting a campaign-level bid modifier value (step 402). According to various implementations, the bid modifier value is set by determining a ratio of predicted conversion rates for different device types. For example, the bid modifier value may be determined as the ratio of a predicted conversion rate for mobile devices to a predicted conversion rate for desktop devices. In some implementations, process 400 may be implemented in conjunction with process 300. For example, process 400 may use an initial bid modifier value determined in process 300 (e.g., when a campaign is first upgraded to a hybrid campaign).

Process 400 includes adjusting bids at the keyword level (step 404). According to various implementations, the bid strategy at the keyword level may be based on an assumption that the return for each keyword is the same. For example, the bid for a particular set of keywords i may be determined as follows to optimize the CPA for the third-party content provider:

$$bid_i = c*pcvr_i*CPA\_target$$

where c is the average cost per action across all sets of keywords (e.g. $cpc_i/pcvr_i=c$), CPA is a cost per action value, and target is the target CPA specified by the third-party content provider.

According to various implementations, steps 402 and 404 of process 400 may be repeated iteratively any number of times to update the bid modifier value calculated in step 402. As shown, an updated bid modifier value 406 determined in step 402 may affect the traffic metrics 408 for each set of keywords. In other words, the keyword traffic mix for the different sets of keywords may change when the bid modifier value is updated. Thus, the conversion rate for each set of keywords may vary based on the updated bid modifier value 406. Since the campaign-level bid modifier value set in step 402 is based on the keyword-level conversion rates in traffic metrics 408, steps 402 and 404 may be repeated iteratively to update the bid modifier value. In various implementations, steps 402 and 404 may be repeated periodically (e.g., every n number of minutes, every day, every week, etc.), in response to a request from a third-party content provider, or at any other time. In some implementations, a smoothing function may be applied to the iteratively calculated bid modifier value, to prevent oscillations.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of generating a single hybrid campaign formed of separate campaigns to reduce processor and memory consumption during real-time content selection, comprising:

determining, by one or more processors of a content selection service executed by a server, for a first set of keywords used by the content selection service to select one or more content of a first campaign for display via a first device type, a first predicted conversion rate, the first campaign stored in a first memory;

determining, by the content selection service, for a second set of keywords used by the content selection service to select the one or more content of the first campaign for display via the first device type, a second predicted conversion rate;

determining, by the content selection service, for the first set of keywords used by the content selection service to select one or more content of a second campaign for display via a second device type different from the first device type, a third predicted conversion rate, the second campaign stored in a second memory;

determining, by the content selection service, for the second set of keywords used by the content selection service to select the one or more content of the second campaign for display via the second device type, a fourth predicted conversion rate;

calculating, by the content selection service, a first predicted campaign-level conversion rate for the first device type based on a traffic-weighted average of the first predicted conversion rate and the second predicted conversion rate;

calculating, by the content selection service, a second predicted campaign-level conversion rate for the second device type based on a traffic-weighted average of the third predicted conversion rate and the fourth predicted conversion rate;

combining, by the content selection service, the first predicted campaign-level conversion rate for the first device type and the second predicted campaign-level conversion rate for the second device type to determine a bid modifier value;

merging, by the content selection service, the first campaign stored in the first memory with the second campaign stored in the second memory using the determined bid modifier to generate a single hybrid campaign for the first device type and the second device type, the hybrid campaign stored in a third memory; and using, by the content selection service during real-time content selection, the single hybrid campaign to provide content to at least one of the first device type and the second device type.

2. The method of claim 1, further comprising:
iteratively determining the first predicted conversion rate and the third predicted conversion rate for the first set of keywords and the second predicted conversion rate and the fourth predicted conversion rate for the second set of keywords.

3. The method of claim 2, further comprising:
applying a smoothing function to changes in the bid modifier value responsive to the iterative determinations.

4. The method of claim 1, wherein the traffic-weighted average of the first predicted conversion rate and the third predicted conversion rate is based on a projected number of clicks for the first set of keywords.

5. The method of claim 1, wherein the first device type includes mobile devices and the second device type includes desktop devices.

6. The method of claim 5, wherein the second device type includes tablet devices.

7. A system for generating a single hybrid campaign formed of separate campaigns to reduce processor and memory consumption during real-time content selection, comprising:
a content election service comprising one or more processors configured to:
determine, for a first set of keywords used by the content selection service to select one or more content of a first campaign for display via a first device type, a first predicted conversion rate, the first campaign stored in a first memory;
determine, for a second set of keywords used by the content selection service to select the one or more content of the first campaign for display via the first device type, a second predicted conversion rate;
determine, for the first set of keywords used by the content selection service to select one or more content of a second campaign for display via a second device type different from the first device type, a third predicted conversion rate, the second campaign stored in a second memory;
determine, for the second set of keywords used by the content selection service to select the one or more content of the second campaign for display via the second device type, a fourth predicted conversion rate;
calculate a first predicted campaign-level conversion rate for the first device type based on a traffic-weighted average of the first predicted conversion rate and the second predicted conversion rate;
calculate a second predicted campaign-level conversion rate for the second device type based on a traffic-weighted average of the third predicted conversion rate and the fourth predicted conversion rate;
combine the first predicted campaign-level conversion rate for the first device type and the second predicted campaign-level conversion rate for the second device type to determine a bid modifier value;
merge the first campaign stored in the first memory with the second campaign stored in the second memory using the determined bid modifier to generate a single hybrid campaign for the first device type and the second device type, the hybrid campaign stored in a third memory; and use, for real-time content selection, the single hybrid campaign to provide content to at least one of the first device type and the second device type.

8. The system of claim 7, wherein the one or more processors are configured to:
iteratively determine the first predicted conversion rate and the third predicted conversion rate for the first set of keywords and the second predicted conversion rate and the fourth predicted conversion rate for the second set of keywords.

9. The system of claim 8, wherein the one or more processors are configured to:
apply a smoothing function to changes in the bid modifier value responsive to the iterative determinations.

10. The system of claim 7, wherein the traffic-weighted average of the first predicted conversion rate and the third predicted conversion rate is based on a projected number of clicks for the first set of keywords.

11. The system of claim 7, wherein the first device type includes mobile devices and the second device type includes desktop devices.

12. The system of claim 11, wherein the second device type includes tablet devices.

13. A computer-readable storage medium having machine instructions stored therein, the instructions being executable by a processor to cause the processor to perform operations to generate a single hybrid campaign formed of separate campaigns to reduce processor and memory consumption during real-time content selection, the operations comprising:
determining, for a first set of keywords used by the content selection service to select one or more content of a first campaign for display via a first device type, a first predicted conversion rate, the first campaign stored in a first memory;
determining, for a second set of keywords used by the content selection service to select the one or more content of the first campaign for display via the first device type, a second predicted conversion rate;
determining, for the first set of keywords used by the content selection service to select one or more content of a second campaign for display via a second device type different from the first device type, a third predicted conversion rate, the second campaign stored in a second memory;
determining, for the second set of keywords used by the content selection service to select the one or more content of the second campaign for display via the second device type, a fourth predicted conversion rate;
calculating a first predicted campaign-level conversion rate for the first device type based on a traffic-weighted average of the first predicted conversion rate and the second predicted conversion rate;
calculating a second predicted campaign-level conversion rate for the second device type based on a traffic-weighted average of the third predicted conversion rate and the fourth predicted conversion rate;
combining, the first predicted campaign-level conversion rate for the first device type and the second predicted campaign-level conversion rate for the second device type to determine a bid modifier value;
merging the first campaign stored in the first memory with the second campaign stored in the second memory using the determined bid modifier to generate a single hybrid campaign for the first device type and the second device type, the hybrid campaign stored in a third memory; and using, by the content selection service during real-time content selection, the single hybrid campaign to provide content to at least one of the first device type and the second device type.

14. The computer-readable storage medium of claim 13, wherein the operations comprise:
iteratively determining the first predicted conversion rate and the third predicted conversion rate for the first set of keywords and the second predicted conversion rate and the fourth predicted conversion rate for the second set of keywords.

15. The computer-readable storage medium of claim 14, wherein the operations comprise:
applying a smoothing function to changes in the bid modifier value responsive to the iterative determinations.

16. The computer-readable storage medium of claim 13, wherein the traffic-weighted average of the first predicted conversion rate and the third predicted conversion rate is based on a projected number of clicks for the first set of keywords.

17. The computer-readable storage medium of claim 13, wherein the first device type includes mobile devices and the second device type includes desktop devices.

* * * * *